US006965822B2

(12) United States Patent
Brome et al.

(10) Patent No.: US 6,965,822 B2
(45) Date of Patent: Nov. 15, 2005

(54) WORK VEHICLE INCLUDING STARTUP CONTROL CURRENT CALIBRATION MECHANISM FOR PROPORTIONAL CONTROL SYSTEMS

(75) Inventors: John G. Brome, Delevan, WI (US); Yun-Ren Ho, Naperville, IL (US)

(73) Assignee: CNH America LLC, Racine, WI (US)

( * ) Notice: Subject to any disclaimer, the term of this patent is extended or adjusted under 35 U.S.C. 154(b) by 567 days.

(21) Appl. No.: 10/199,848

(22) Filed: Jul. 19, 2002

(65) Prior Publication Data

US 2004/0020198 A1 Feb. 5, 2004

(51) Int. Cl.$^7$ ............................................. G06F 19/00
(52) U.S. Cl. .............................. 701/50; 173/2; 700/28
(58) Field of Search .......................... 701/50; 73/1.01; 60/500; 172/2; 700/28

(56) References Cited

U.S. PATENT DOCUMENTS

| | | | |
|---|---|---|---|
| 4,281,584 A | | 8/1981 | Onken et al. |
| 4,979,092 A | * | 12/1990 | Bergene et al. ............... 700/28 |
| 5,623,093 A | * | 4/1997 | Schenkel et al. ............ 73/1.01 |
| 5,631,632 A | | 5/1997 | Nakashima et al. |
| 5,733,017 A | | 3/1998 | Nakashima et al. |
| 5,855,108 A | | 1/1999 | Salz et al. |
| 5,944,159 A | | 8/1999 | Schneider et al. |
| 6,058,343 A | | 5/2000 | Orbach et al. |
| 6,158,545 A | | 12/2000 | Kaji et al. |
| 6,223,530 B1 | | 5/2001 | Weber |
| 6,253,140 B1 | | 6/2001 | Jain et al. |
| 6,298,969 B1 | | 10/2001 | Nagler et al. |
| 6,308,812 B1 | | 10/2001 | Eike et al. |
| 6,325,714 B1 | | 12/2001 | Tanis et al. |
| 6,356,829 B1 | | 3/2002 | Fan et al. |
| 6,386,303 B1 | | 5/2002 | Zibuschka et al. |
| 6,401,456 B1 | * | 6/2002 | Moriya et al. ................ 60/433 |

* cited by examiner

Primary Examiner—Yonel Beaulieu
(74) Attorney, Agent, or Firm—Brant T. Maurer; Rebecca Henkel

(57) ABSTRACT

A method of calibrating the control current startup threshold in a proportionally controlled drive system for a work vehicle is disclosed. To determine a current threshold value for use in the system a control current exhibiting a relatively low value is first applied to the system. Subsequently, the steps of repetitively increasing the control current to a control current start value at which system motion starts and decreasing the control current to a control current stop value at which system motion substantially stops are repetitively conducted. The resultant control current start values and control current stop values are stored in a memory. The stored control current start values and control current stop values are is then averaged to determine a control current threshold value for use in controlling the system.

23 Claims, 8 Drawing Sheets

WORK VEHICLE INCLUDING STARTUP CONTROL CURRENT CALIBRATION MECHANISM FOR PROPORTIONAL CONTROL SYSTEMS

BACKGROUND

The disclosures herein relate generally to the field of control systems for work vehicles. More particularly, the disclosures herein relate to a system and method for quickly determining the threshold control current necessary to actuate a proportional control system such as a hydro-mechanical system on a work vehicle.

To operate a modern hydraulic control system it is important to determine the startup threshold current of devices such as pumps, clutches, valves and other mechanisms which are controlled via control signals. These devices have a common operating requirement, namely that they all require some minimum amount of current, i.e. the startup threshold current, to start operating. The conventional approach to determining such startup threshold currents is to employ an automatic calibration process to measure the startup threshold current for a hydraulic system by ramping up the control signal slowly until the controlled device starts to move. This ramping step is repeated several times and the results are averaged to yield an average startup threshold current. Unfortunately, this calibration process takes a relatively large amount of time to obtain accurate results. Since hydraulic systems exhibit system dynamics and nonlinear characteristics, the ramp up speed is essential to the accuracy of threshold current calibration.

What is needed is a methodology for more quickly automatically determining the startup threshold currents for controlled devices without sacrificing calibration accuracy. Such a methodology would be especially useful in work vehicles such as combines and other agricultural implements requiring calibration of their hydraulic, pneumatic and other proportional control systems.

SUMMARY

Accordingly, in one embodiment a method of operating a proportional control drive system is disclosed which includes applying a control current to a controlled device; repetitively increasing the control current to a control current start value at which system motion starts and decreasing the control current to a control current stop value at which system motion substantially stops; storing in a memory the control current start values and control current stop values; and averaging the control current start values and control current stop values to determine a current threshold value.

A principal advantage of the embodiment disclosed herein is significantly expedited threshold current determination.

DETAILED DESCRIPTION

While being generally applicable to systems under proportional control, the disclosed methodology is described with respect to the hydro-mechanical drive system of agricultural equipment such as a combine by way of example.

Agricultural work vehicles such as combines utilize a header or other implement to perform various operations on a field. Combines often employ an implement such as a harvester or header attached to a feeder to harvest a crop or other plant-related matter. The feeder receives the cut or harvested crop from the header and provides the harvested crop to various pieces of equipment within the combine which perform assorted operations on the harvested crop such as sorting, separating, spreading, storing, or other agricultural functions.

Generally, combines have a combustion engine or mechanical power source indirectly driving the various pieces of equipment which operate on the harvested crop. The various pieces of equipment can include, but are not limited to, a feeder which receives the harvested crop from the header and transports the harvested crop to within the combine, a rotor which receives the harvested crop from the feeder and spins axially to thresh or separate the seed from the non-seed material of the harvested crop, a shoe shaker which separates additional seed from the non-seed material from the rotor, a straw spreader which spins to throw the non-seed material received from the shoe shaker out of the combine, a tailings elevator which conveys seed from the shoe shaker to the rotor, a clean grain elevator which transports seed from the rotor to the grain storage tank or external grain storage area, a discharge beater, a chopper which cuts the non-seed material for spreading by the straw spreader, a cleaning fan which provides cross air movement across the seed material to clean the seed material as it is conveyed through the combine, a rotary air screen fan which provides cooling for the combustion engine, as well as other types of devices which are driven by the engine. An unloader apparatus, typically a swingable auger tube, is stowed alongside the combine in a plane parallel with the combine's wheels. This unloader tube is capable of swinging from the stowed position to a position which is approximately 90 degrees perpendicular to the stowed position. The unloader tube is swung back and forth by the operator over a grain receiving bin in a storage vehicle which is positioned alongside the combine.

Figure 1:
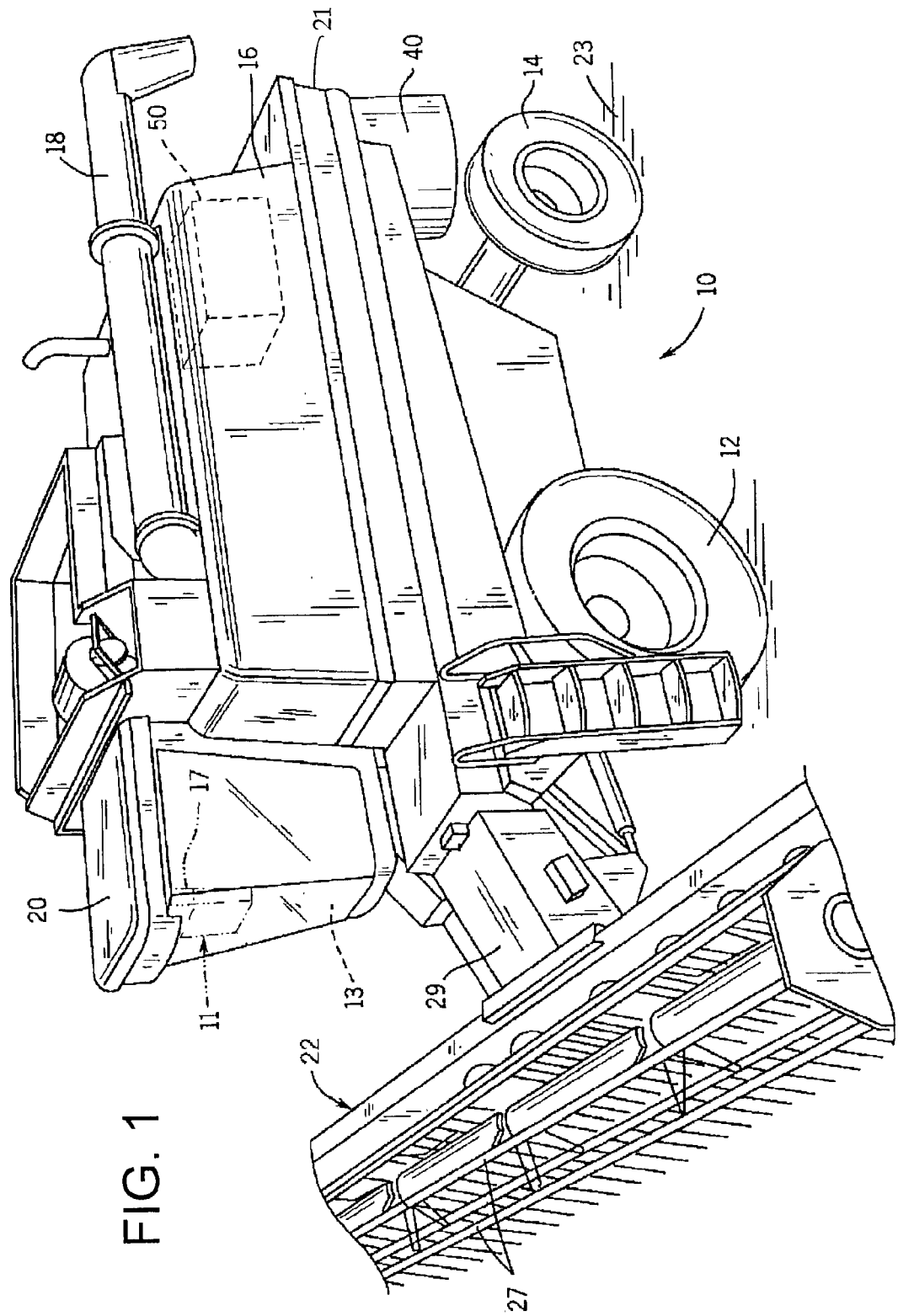
FIG. 1 is a perspective view illustrating an embodiment of an agricultural harvesting vehicle.

As shown in FIG. 1, a work vehicle, namely agricultural vehicle 10, includes a pair of drive wheels 12 located at the front end of vehicle 10, a pair of steerable wheels 14 located at the rear end of vehicle 10, a machinery and grain storage compartment or housing 16, a grain elevator/auger and grain unloading tube 18, an operator cab 20, and a support frame or chassis 21 for joining and supporting the above-listed components.

Attached to a feeder 29 at the front end of the frame of vehicle 10 (i.e., the front-most end of vehicle 10 along its forward direction of travel during harvesting) is a header 22 such as a grain harvesting header. Header 22 is positioned relative to vehicle 10 and/or the surface 23 upon which vehicle 10 is moving (i.e., the ground from which the respective plant related matter, grain or vegetation, is being harvested). Header 22 includes a reel 27 for gathering the cut crop. The harvested crop is provided to feeder 29 which includes an auger or conveyor mechanism for transporting the harvested crop from header 22 to within combine 10. Vehicle 10 includes a straw spreader 40 as shown. Vehicle 10 includes an engine 50 to provide motive power to move vehicle 10 and power to operate the various components included therein, such as straw spreader 40, for example.

Agricultural vehicle 10 includes a control system 11 mounted in an interior 13 of cab 20. Control system 11 is coupled to a display 17 preferably located within interior 13 of cab 20 easily visible to the operator. Display 17 can be also be located on a vertical post within the interior 13 of cab 20. Display 17 is conveniently implemented as a liquid crystal display (LCD), a light emitting diode (LED) array, an incandescent lamp array, a cathode ray tube (CRT), a plasma display or other display devices. Information regarding the status of the various mechanical and electrical systems of vehicle 10 is conveniently provided to the operator on display 17.

Figure 2:
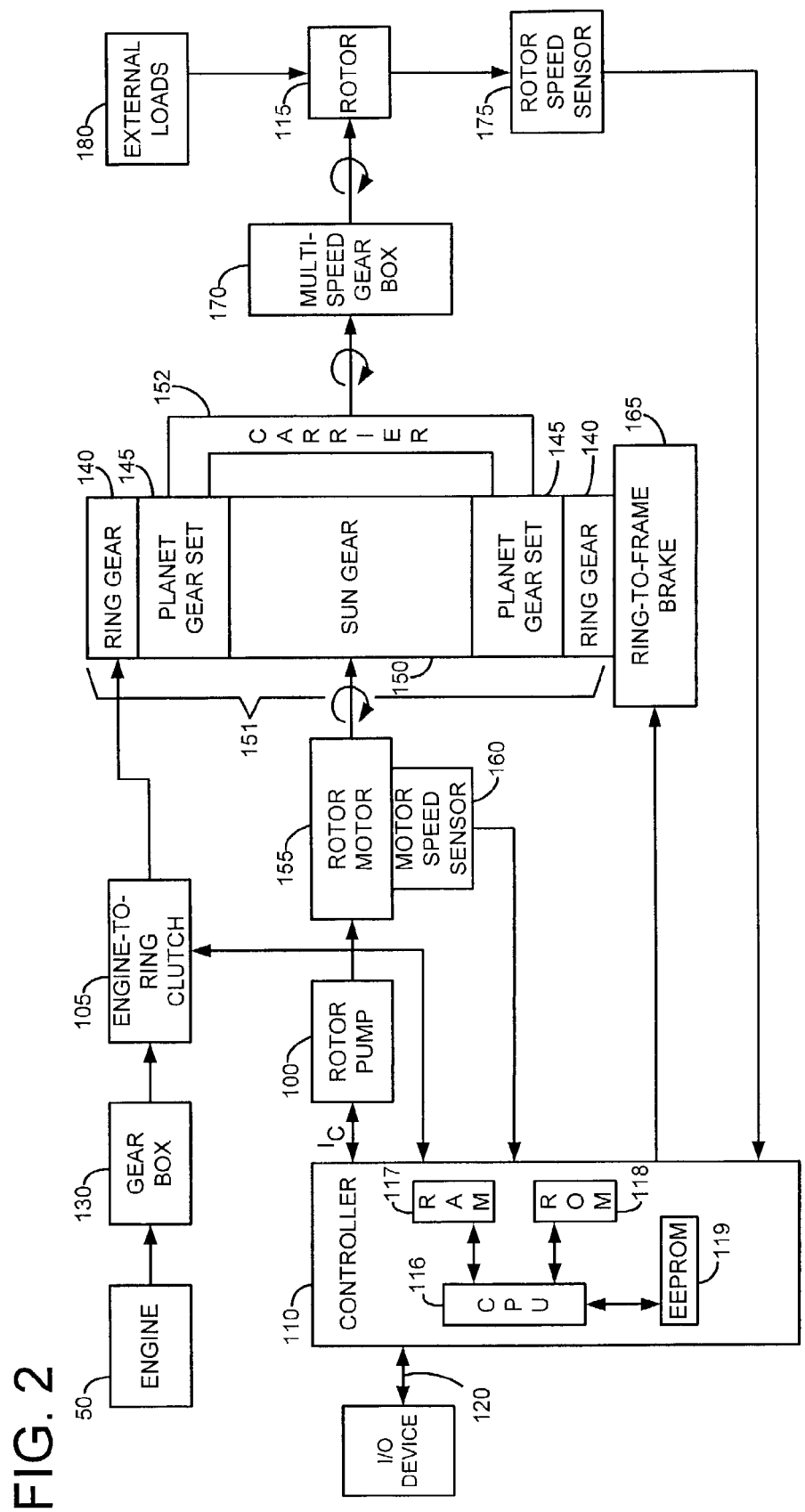
FIG. 2 is a block diagram of a control system for the vehicle of FIG. 1.

A work vehicle such as combine 10 is illustrated in block diagram form in FIG. 2. Combine 10 includes a number of hydraulic systems which require startup threshold current calibration. For example, hydraulic rotor pump 100 and engine-to-ring (ETR) clutch 105 form part of a rotor control system which requires startup current threshold current calibration. In more detail, combine 10 includes a rotor controller 110 that controls a rotor 115 which is driven by engine 50. Rotor 115 is a cylindrically shaped device which facilitates the threshing of the crop ingested by combine 10. Concaves (not shown), positioned close to the rotor, scrape and separate grain from the chaff as the rotor rotates. Rotor 115 is controlled electronically and hydraulically as now explained. Typical instructions carried out by controller 110 to control the operation of rotor 115 include 1) rotor accelerate, 2) rotor decelerate 3) de-slug—namely, to slowly rotating the rotor forward or reverse to flush compacted crop between the rotor and the concaves, and 4) calibrate. Rotor controller 110 receives these instructions from another controller (not shown) via controller area network (CAN) 120 and controller 110 provides status information such as rotor speed and direction to other controllers in combine 10 and to display 17 over the same CAN bus of CAN 120.

Rotor controller 110 includes a central processing unit (CPU) 116 which is coupled to a random access memory (RAM) 117 that provides temporary storage for information. CPU 116 is also coupled to a read only memory (ROM) 118 in which control software is permanently stored. Control software governs the operation of controller 110 and rotor 115 as will be discussed later in more detail. A electronically erasable programmable read only memory (such as EEPROM) 119 is included in controller 110.

As shown in FIG. 2, engine 50 is coupled to gear box 130. Gear box 130 drives engine-to-ring clutch 105 which drives ring gear 140 when the clutch is engaged under the control of rotor controller 110. A planet gear set 145 (multiple planet gears connected by carrier 152) is coaxially mounted within ring gear 140. Planet gear set 145 is coaxially mounted to sun gear 150. Ring gear 140, planet gear set 145 and sun gear 150 are concentric, each being coaxially mounted with respect to the other. Together ring gear 140, planet gear set 145 and sun gear 150 are collectively referred to as planetary 151. Rotor motor 155 drives sun gear 155 as directed by rotor controller 110 via the rotor pump 100. In more detail, rotor pump 100 is coupled to and controlled by rotor controller 110. Rotor pump 100 is connected to rotor motor 155 to drive sun gear 150. A motor speed sensor 160 is connected to rotor motor and rotor controller 110 so that the rotational velocity of rotor motor 155 can be reported back to controller 110.

A ring-to-frame brake 165 is mechanically connected to ring gear 140 and electrically connected to rotor controller 110 so that controller 110 can control the braking and hence the deceleration of rotor 115. As seen in FIG. 2, rotor 115 is mechanically connected by a multi-speed gearbox 170 to carrier 152. A rotor speed sensor 175 is connected to rotor 115 and controller 110 to report the rotational velocity of rotor 115 back to controller 110. External loads driven by rotor 115 are indicated collectively as external loads 180.

More detail is now provided with respect to selected components of vehicle 10. Rotor pump 100 is used in conjunction with rotor motor 155 to hydrostatically accelerate rotor 115 from rest through planetary 151 and gear box 170. Rotor pump 100 is also employed in conjunction with rotor motor 155 to hydrostatically adjust the rotor speed after initial hydrostatic acceleration since engine 50 at this point provides the majority of the power for rotor 115 via engine-to-ring clutch 105, planetary 151 and rotor gear box 170.

The purpose of the ring-to-frame brake 165 is to hold ring gear 140 of planetary 151 stationary. This allows rotor pump 100, rotor motor 155, planetary 151 and gear box 170 to drive rotor 115 hydrostatically either during initial start-up of is rotor 115 when a separator switch (not shown) is engaged, or to control the rotor 115 in a "de-slug" mode of operation should too much crop be ingested at one time for the rotor to properly separate the crop, or to allow rotor controller 110 to calibrate the rotor system.

The purpose of engine-to-ring (ETR) clutch 105 is to engage engine 50 with planetary 151 after ring-to-frame (RTF) brake 165 is disengaged to drive rotor 115 through planetary 151 and rotor gear box 170. With ETR clutch 105 engaged and RTF brake 165 disengaged, engine 50 provides the majority of the rotor's power and rotor pump 100 and rotor motor 155, at that time, are only used to make small changes to the rotor's speed by controlling the speed and direction of the planetary's 151 sun gear 150.

Figure 3:
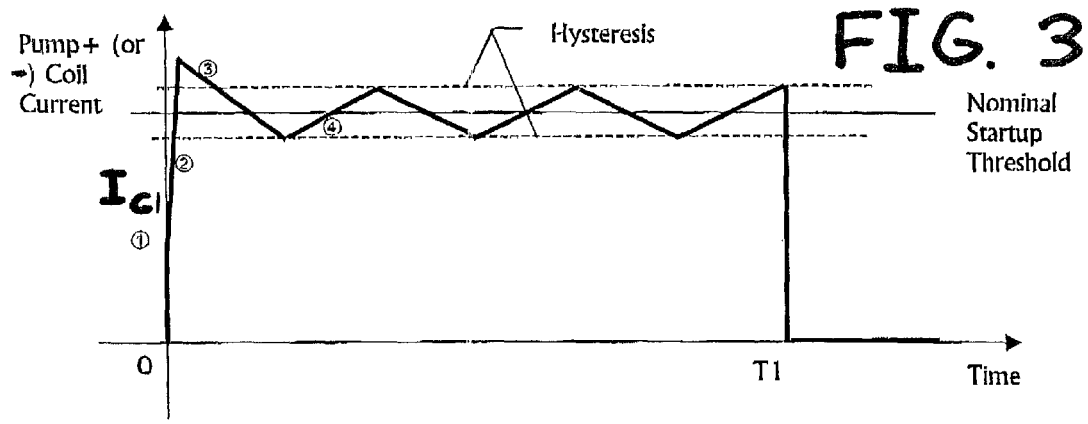
FIG. 3 is a pump coil current vs. time graph depicting the time history for pump coil startup threshold current calibration.
Figure 4:
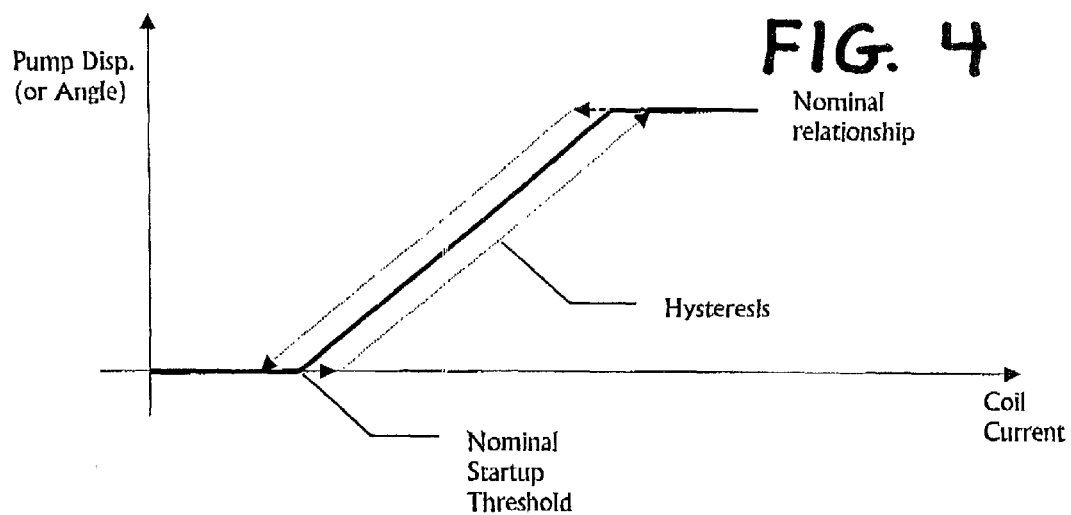
FIG. 4 is a pump displacement (or angle) vs. pump coil current graph for the control system of FIG. 2.
Figure 5:
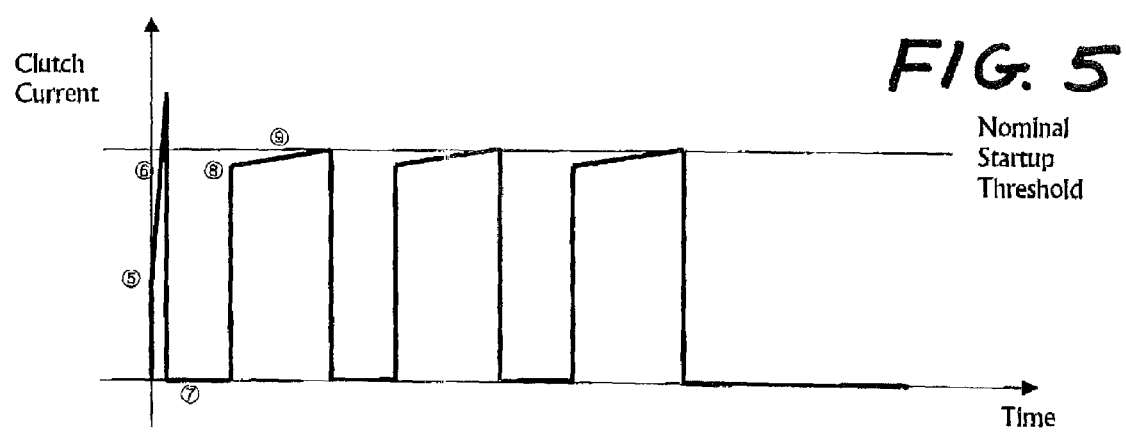
FIG. 5 is a clutch current vs. time graph showing the time history for the clutch startup threshold current calibration.

A high level overview of an automatic calibration process for setting the startup threshold current of hydraulic devices such as rotor pump 100 and ETR clutch 105 is now presented with reference to FIGS. 3, 4 and 5. The process is implemented by control software stored in ROM 118 and executed by CPU 116 of controller 110. To begin the process of start rotor pump threshold current calibration for spinning forward or reverse, the control current, $I_{C1}$, supplied to rotor pump 100 initially jumps to a value 1 (FIG. 3) which is predetermined to be below any possible startup threshold current. FIG. 3 is a graph depicting control current, $I_{C1}$, vs. time. As seen in FIG. 3, when controller 110 commences calibration it initially sets the control current, $I_{C1}$, to a value designated at 1. Controller 110 then permits the control current to increase rapidly until rotor motor 155 starts to move at 2. Controller 110 can readily ascertain when motor 155 commences rotation by monitoring the motor speed signal received from motor speed sensor 160. Then, as seen in FIG. 3, the control current decreases slowly as designated at 3 until rotor motor 155 ceases rotation. The control current value observed at the point in time when the motor ceases rotation is saved in memory (RAM) 117 as a command current value or stop value. Controller 110 again increases the control current, $I_{C1}$, to commence motor rotation but this time slowly until the motor begins rotating as indicated at 4. The control current value observed when the motor begins rotating this second time is also stored in RAM 117 as a command current value or start value. The above described process is repeated several times. The stored command current values which include both stopping and starting command current values are averaged to determine a nominal startup threshold current. The process is terminated after several start-stop cycles at time, T1. FIG. 4 is a graphical representation of rotor pump 100 displacement (or angle) vs. the coil current of pump 100 showing a hysteresis effect between starting and stopping.

A high level overview of an automatic calibration process for setting the startup threshold current of hydraulic devices such as ETR clutch 105 is now presented with reference to FIG. 5. FIG. 5 is a graph depicting control current, $I_{C2}$, vs. time. The calibration process is implemented by control software stored in ROM 118 and executed by CPU 116 of controller 110. To begin the process of clutch threshold current calibration under control of rotor controller 110 the control current, $I_{C2}$, supplied to ETR clutch 105 initially jumps to a value 5 which is predetermined to be below any possible startup threshold current. The control current, $I_{C2}$, then increases quickly at 6 until the output side of the clutch starts to move. At this point, the command current value is saved in RAM 117 as a reference value. Next, rotor controller 110 commands ETR clutch 105 to release and the control current, $I_{C2}$, goes to zero at 7. After the output side of the clutch slows down, the control current, $I_{C2}$, suddenly jumps to a value indicated at 8, a function of, the previous reference value stored in RAM. Then, rotor controller 110 increases the control current, $I_{C2}$, slowly until the output of ETR clutch 105 starts moving as indicated at 9. At the point where the output of clutch 105 starts moving the command current value is again stored in RAM 117. This process of releasing the clutch and increasing the control current is repeated several times and the stored data is averaged to determine a nominal startup threshold current for clutch 105.

Figure 6:
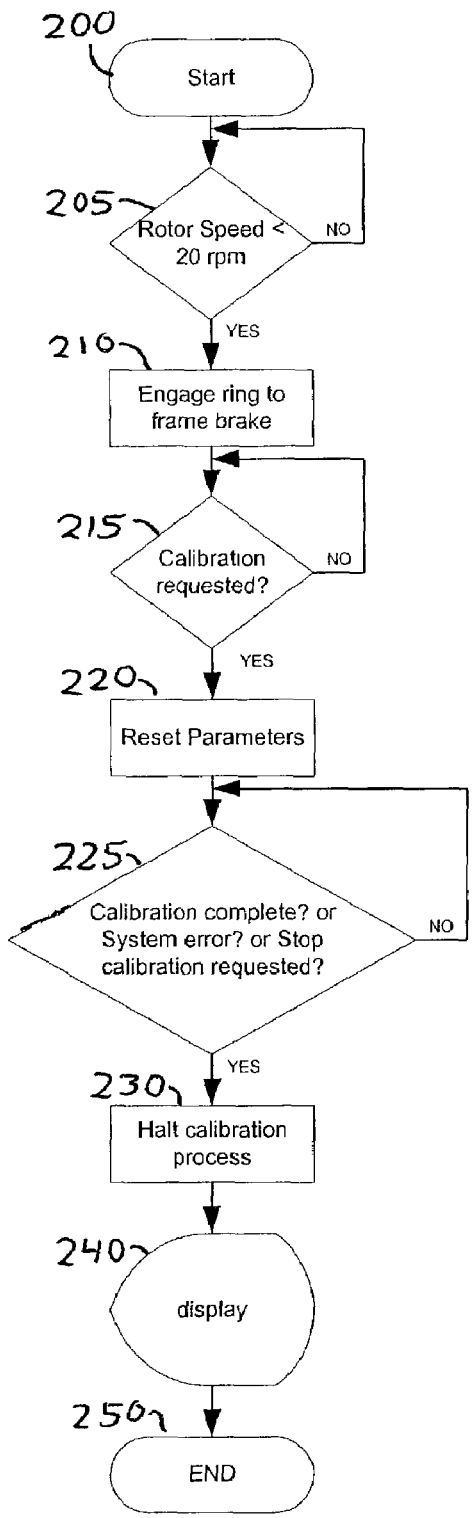
FIG. 6 is a flow chart depicting how the startup threshold current calibration method fits into the operation of a controller employed in the control system of FIG. 2.

FIG. 6 is a flow chart depicting how the startup threshold calibration method fits into the operation of controller 110 at a high level. Rotor controller 110 is initialized at start block 200. Controller 110 monitors rotor speed via sensor 175 as indicated at decision block 205 until rotor speed falls below 20 rpm. When rotor speed is less than 20 rpm, process flow continues and ring-to-frame brake 165 is engaged as per block 210. Controller 110 monitors to determine if calibration is requested as per decision block 215. If calibration is requested then controller 110 resets parameters, namely the data values stored in RAM 117 as per block 220. A test is conducted at decision block 225 to see if calibration is complete, or if there is a system error, or a stop calibration request is received. If any of these conditions occur, then the calibration process is halted as per block 230. Results and status are displayed as per block 240 and the process ends. Otherwise, the calibration process depicted in more detail in the flowchart of FIGS. 7A, 7B and 7C continues to completion after the test at decision block 225.

Figure 7A:
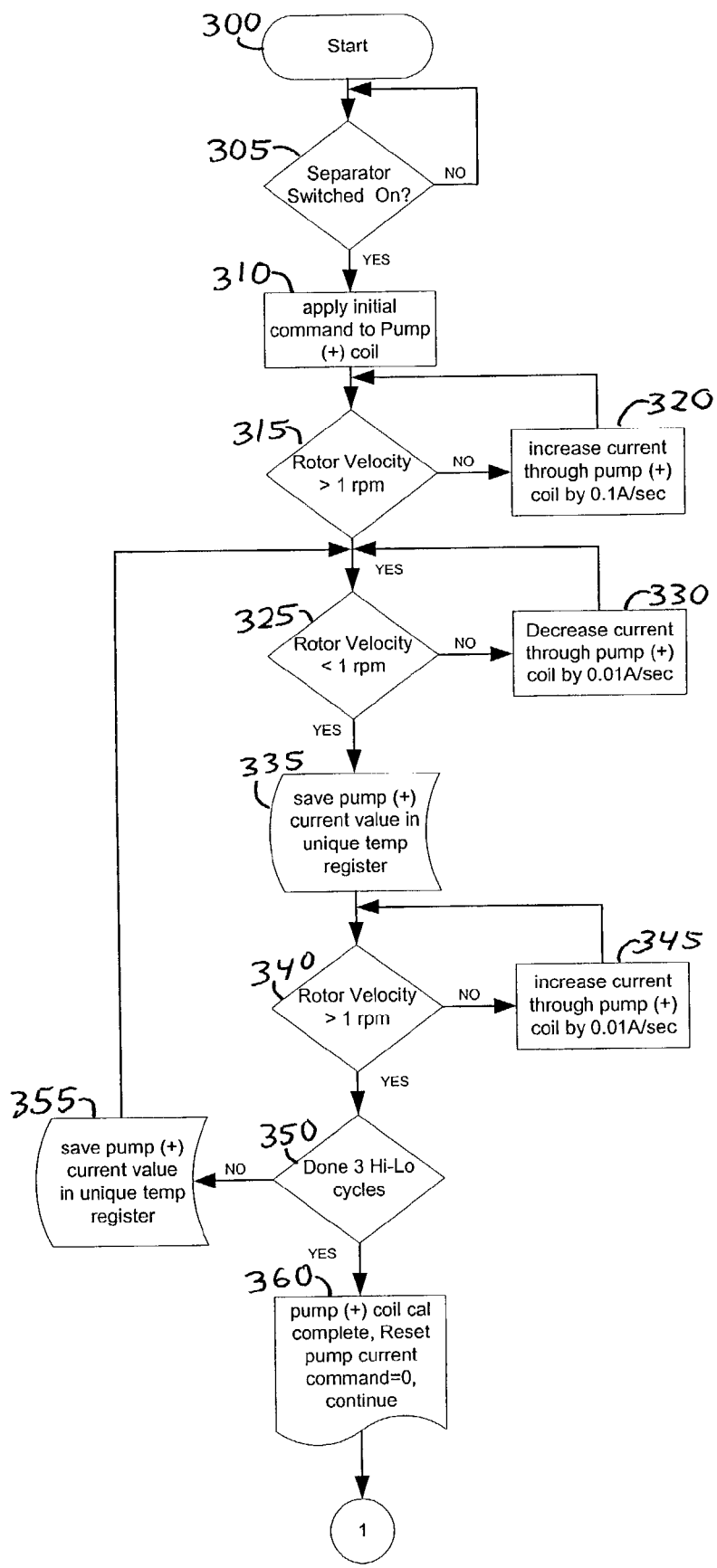
FIG. 7A is a flow chart showing the process for determining the startup control current threshold for the positive coil of the rotor pump.

As shown in FIG. 7A, the calibration process carried out by controller 110 begins at start block 300. A test is conducted at decision block 305 to determine if the separator switch is on. If the separator switch is determined to be on, then process flow continues to block 310 at which an initial current control command is applied to the positive (+) coil terminal of rotor pump 100. A test is conducted to determine if the rotor velocity is greater than 1 rpm at decision block 315. If the rotor velocity is not greater than 1 rpm then controller 110 increases the control current through the coil of rotor pump 100 by 0.1 A/sec as per block 320. When the rotor velocity exceeds 1 rpm then a second test is conducted at decision block 325 to determine if the rotor velocity is now less than 1 rpm. If the rotor velocity is not found to be less than 1 rpm, then controller 110 decreases the control current through the coil of rotor pump 100 by 0.01 A/sec as per block 330. When the rotor velocity ultimately decreases to the point where it is less than 1 rpm then the control current value corresponding to that point is stored in RAM 117 or in a temporary register in CPU 116 as per block 335.

A test is then conducted at decision block 340 to determine if the rotor velocity has increased to more than 1 rpm. If the rotor velocity has not so increased, then controller 110 increases the control current through the + terminal of the pump coil by 0.01 A/sec as per block 345. When decision block 340 finds that the control current has now increased to a point at which the rotor velocity is greater than 1 rpm, then the control current value corresponding to that point is stored in RAM 117 or in a temporary register in CPU 116. The above described sequence is repeated several times and the control current values from each cycle are averaged together to obtain the control current threshold value to be used by vehicle 10. More specifically, a test is run at decision block 350 to determine if 3 high-low cycles have been conducted. If so, the pump (+) coil control current threshold calibration is complete as per block 360. The average of the saved control current thresholds from each cycle is stored for later use as the positive (+) control current threshold. The command current is set back to zero in preparation for determining the control current threshold for the negative (−) terminal of the pump coil.

Figure 7B:
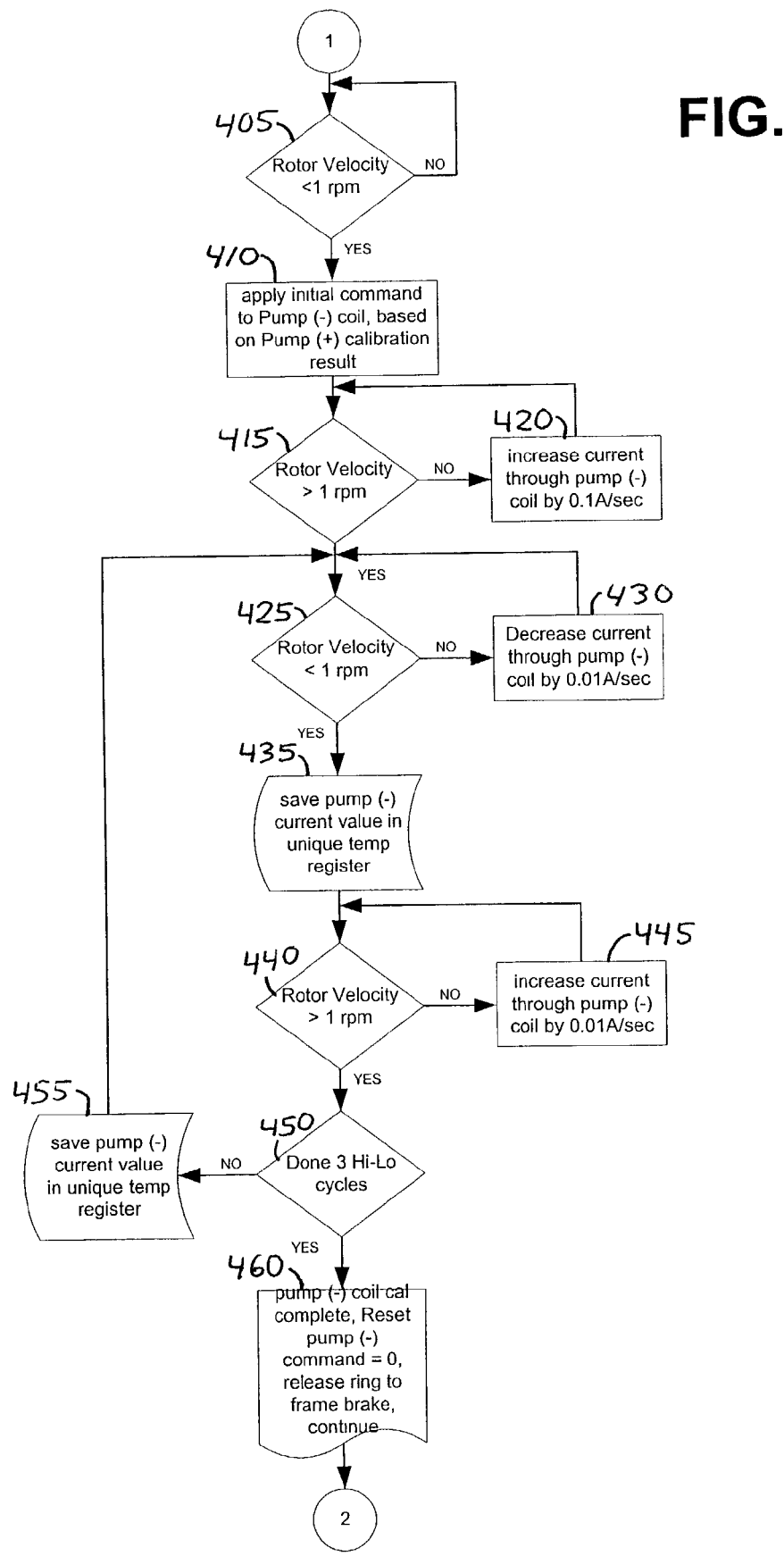
FIG. 7B is a flow chart showing the process for determining the startup control current threshold for the negative coil of the rotor pump.

The flowchart continues on FIG. 7B which depicts the steps carried out to determine the control current threshold for the negative (−) terminal of pump coil 100. A test is conducted at decision block 405 to determine if the rotor velocity is less than 1 rpm. If the rotor velocity is less than 1 rpm then flow continues to block 410 at which an initial current control command is applied to the negative (−) terminal of the rotor pump's coil. A test is conducted to determine if the rotor velocity is greater than 1 rpm at decision block 415. If the rotor velocity is not greater than 1 rpm then controller 110 increases the control current through the coil of rotor pump 100 by 0.1 A/sec as per block 420. When the rotor velocity exceeds 1 rpm then a second test is conducted at decision block 425 to determine if the rotor velocity is now less than 1 rpm. If the rotor velocity is not found to be greater than 1 rpm, then controller 110 decreases the control current through the coil of rotor pump 100 by 0.01 A/sec as per block 430. When the rotor velocity ultimately decreases to the point where it is less than 1 rpm then the control current value corresponding to that point is stored in RAM 117 or in a temporary register in CPU 116 as per block 435.

A test is then conducted at decision block 440 to determine if the rotor velocity has increased to more than 1 rpm. If the rotor velocity has not so increased, then controller 110 increases the control current through the negative (−) terminal of the pump coil by 0.01 A/sec as per block 445. When decision block 440 finds that the control current has now increased to a point at which the rotor velocity is greater than 1 rpm, then the control current value corresponding to that point is stored in RAM 117 or in a temporary register in CPU 116. The above described sequence is repeated several times and the control current values from each cycle are averaged together to obtain the control current threshold value to be used by vehicle 10. More specifically, a test is run at decision block 450 to determine if 3 high-low cycles have been conducted. If so, the pump negative (−) coil control current threshold calibration is complete as per block 460. The average of the saved control current thresholds from each cycle is stored for later use as the negative control current threshold.

Figure 7C:
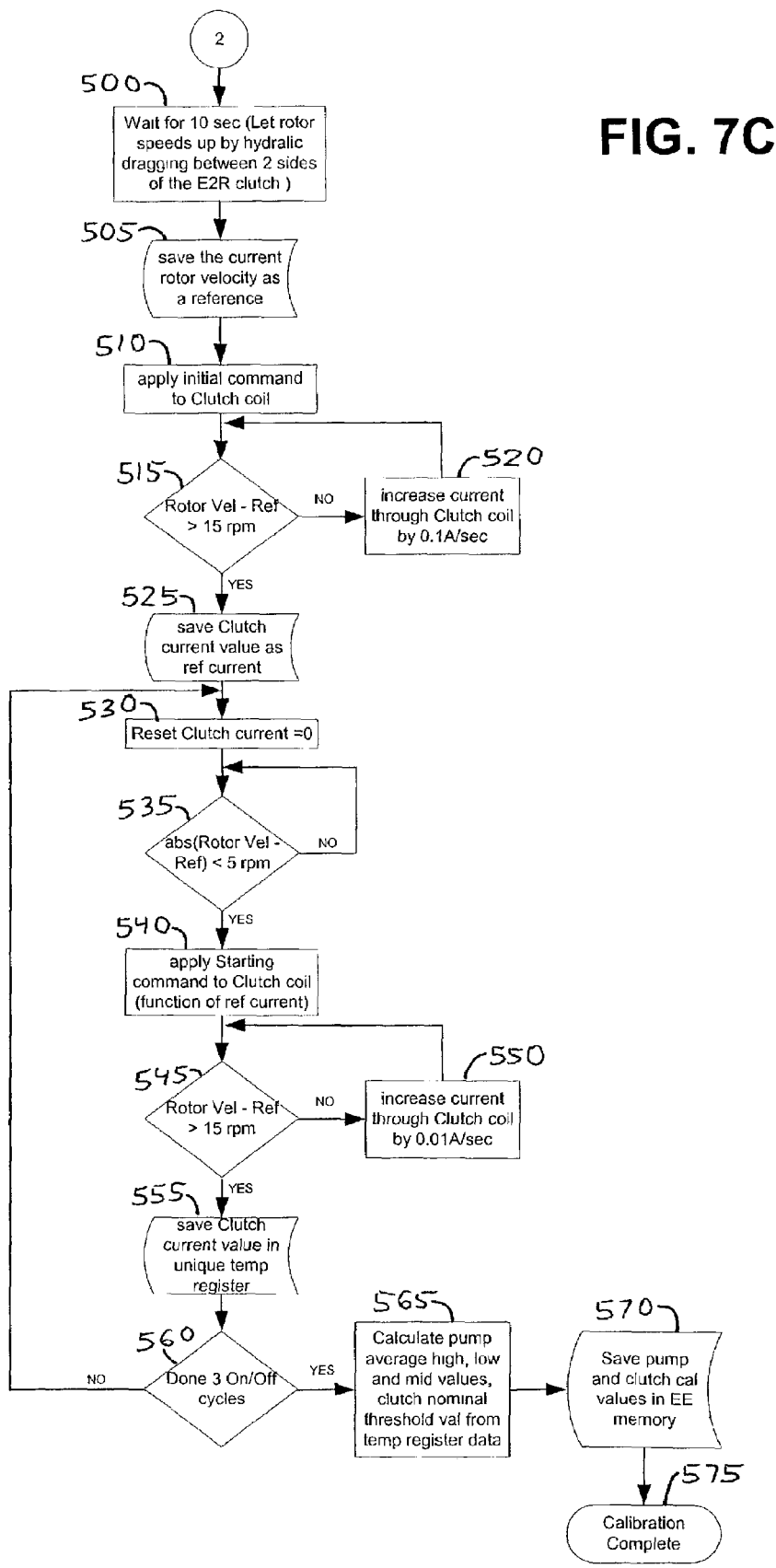
FIG. 7C is a flow chart showing the process for determining the startup control current threshold for a clutch mechanism of the vehicle.

The flowchart continues on FIG. 7C which depicts the steps carried out to determine the control current threshold for ETR clutch 105. Controller 110 waits for 10 seconds as per block 500 to allow rotor 115 to speed up by way of the hydraulic dragging between two sides of ETR clutch 105. Controller 110 then saves the current rotor velocity in RAM 117 as a reference as per block 505. Controller 110 applies an initial command to the coil in ETR clutch 105 to cause current to flow in the coil as per block 510. A test is then conducted at decision block 515 to determine if the velocity difference between the rotational velocity of rotor 115 and the reference rotor speed mentioned above is greater than 15 rpm. If the velocity difference is not greater than 15 rpm, the control current through the clutch coil is increased by 0.1 A/sec as per block 520. When the velocity difference ultimately exceeds 15 rpm, then the present clutch control current value is saved in RAM 117 as a reference control current value as per block 525. The clutch current value applied to ETR clutch 105 is reset to zero as per block 530. A test is conducted at decision block 535 to determine if the absolute value of the velocity difference is less than 5 rpm. When the absolute value of the velocity difference decreases to less than 5 rpm, then controller 110 applies a starting command to the coil of ETR clutch 105. As per block 540 the stored reference current is used in this command.

A test is then conducted at decision block 545 to determine if the rotor velocity has increased to greater than 15 rpm. If not, as per block 550 the control current through the clutch coil is increased by 0.01 A/sec. When test block 545 ultimately finds that the velocity difference has increased to greater than 15 rpm, the present control current value applied to the rotor coil is saved in memory as per block 555. The above test sequence is conducted several times and the control current values determined in each test sequence are saved. A test is carried out at decision block 560 to determine if the test sequence has been conducted 3 times. If not, process flow continues back to block 530 and the test is repeated. However, when decision block 560 finds that the test sequence has been conducted 3 times, process flow continues to block 565 at which 1) for rotor pump 100, the average of the high threshold pump control current values, the average the low pump control current threshold values, and an overall average or median threshold value is calculated from all stored pump control current values, and 2) the nominal control current threshold value for ETR clutch 105 is calculated by averaging the stored threshold control current values for the clutch. These values are then saved in an electronically erasable programmable read only memory (EEPROM) 119 in controller 110 as per block 570. This completes the automatic determination of startup control threshold currents for rotor pump 100 and ETR clutch 105 as noted in block 575. The values thus determined are used subsequently as the startup threshold control currents for the pump and clutch respectively.

The processes described by the flowcharts mentioned above are not limited to pumps containing two coils but rather by reversing the direction of current, the same process would apply to single coil pumps. Moreover, this process can be adaptive for successive calibrations of the same coil or coil type. The reference current value, from a first calibration, can be used for successive calibrations to significantly reduce the amount of calibration time. Additionally, the incremental current rates can be modified to more quickly realize the max/min thresholds by first "jumping" to a current close to the threshold and then slowly incrementing to the anticipated current threshold.

Advantageously, the process described herein achieves a significantly expedited threshold control current determination. Moreover, the method can be applied to different proportional control systems, whether they are hydraulic, pneumatic or otherwise. The method readily adapts to different systems having different control current requirements and thresholds.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A method of operating a proportional control system comprising:
    (a) applying a control current to a controlled device;
    (b) repetitively increasing the control current to a control current start value at which system motion starts and decreasing the control current to a control current stop value at which system motion stops;
    (c) storing, in a memory, the control current start values and control current stop values; and
    (d) averaging the control current start values to determine a control current threshold value to start motion of the controlled device and averaging the control current stop values to determine a control current threshold value to stop motion of the controlled device of the proportional control system.

2. The method of claim 1 wherein the control current in step (a) initially exhibits a value less than the current needed to cause the controlled device to move.

3. The method of claim 1 wherein the repetitively increasing of the control current step further comprises an incremental increasing of the control current.

4. The method of claim 1 wherein the controlled device is a hydraulic device.

5. The method of claim 1 wherein the controlled device is a pneumatic device.

6. The method of claim 1 wherein the controlled device is an electrically controlled rotor pump.

7. The method of claim 1 wherein the controlled device is an electrically controlled clutch.

8. The method of claim 6 wherein the pump includes a positive (+) coil and a negative (−) coil, the method being applied to determine a control current threshold value for the positive (+) coil.

9. The method of claim 8 comprising repeating steps (a) through (d) using the control current threshold value for the positive (+) coil to decide the control current start value for a determination of the control current threshold for the negative (−) coil.

10. The method of claim 6 wherein the pump includes a positive (+) coil and a negative (−) coil, the method being applied to determine a control current threshold value for the negative (−) coil.

11. The method of claim 8 comprising repeating steps (a) through (d) using the control current threshold value for the negative (−) coil to decide the control current start value for a determination of the control current threshold for the positive (+) coil.

12. A method of operating a control system for a hydro-mechanical controlled device comprising:
(a) applying a control current to a controlled device;
(b) increasing the control current until the controlled device begins to move at a rotational velocity greater than a predetermined rotational velocity;
(c) decreasing the control current until the controlled device rotates at a rotational velocity less than the predetermined rotational velocity;
(d) storing, in a memory, the control current determined in step (c), the value thus stored being designated as a control current stop value;
(e) increasing the control current again until the controlled device begins to rotate at a rotational velocity greater than the predetermined rotational velocity;
(f) storing, in the memory, the control current determined in step (e), the value thus stored being designated as a control current start value; and
(g) repeating steps (c), (d), (e), and (f) and averaging the resultant control current start values to determine a control current threshold value to start motion of the controlled device, and averaging the control current stop values to determine a control current threshold value to stop motion of the controlled device of the control system.

13. A work vehicle comprising:
a chassis;
an operator station on the chassis;
a controlled device situated on the chassis and activated in response to a control current; and
a calibration system, coupled to the controlled device and including a memory wherein the calibration system is configured for:
(a) applying a control current to the controlled device;
(b) repetitively increasing the control current to a control current start value at which motion of the controlled device starts and decreasing the control current to a control current stop value at which such motion stops;
(c) storing, in a memory, the control current start values and control current stop values; and
(d) averaging the control current start values and control current stop values to determine a control current threshold value.

14. The vehicle of claim 13 wherein the controlled device is an electrically activated hydraulic device.

15. The vehicle of claim 13 wherein the controlled device is an electrically activated pneumatic device.

16. The vehicle of claim 13 wherein the controlled device is an electrically controlled rotor pump.

17. The vehicle of claim 13 wherein the controlled device is an electrically controlled clutch.

18. An agricultural harvesting vehicle comprising:
a main body;
an operator station on the chassis;
a controlled device situated on the main body and activated in response to a control current; and
a calibration system, coupled to the controlled device and including a memory wherein the calibration system is configured for:
(a) applying the control current to the controlled device;
(b) repetitively increasing the control current to a control current start value at which motion of the controlled device exceeds a predetermined value and decreasing the control current to a control current stop value at which motion of the controlled device is less than the predetermined value;
(c) storing, in a memory, the control current start values and control current stop values; and
(d) averaging the control current start values and control current stop values to determine a control current threshold value.

19. The vehicle of claim 18 wherein the motion is rotational motion.

20. The vehicle of claim 18 wherein the controlled device is an electrically activated hydraulic device.

21. The vehicle of claim 18 wherein the controlled device is an electrically activated pneumatic device.

22. The vehicle of claim 18 wherein the controlled device is an electrically controlled rotor pump.

23. The vehicle of claim 18 wherein the controlled device is an electrically controlled clutch.

* * * * *